(12) United States Patent
Morishita et al.

(10) Patent No.: US 6,806,317 B2
(45) Date of Patent: Oct. 19, 2004

(54) PRESSURE-SENSITIVE ADHESIVE/ADHESIVE AND BLOCK COPOLYMER SUITABLE FOR USE THEREIN

(75) Inventors: Yoshihiro Morishita, Ibaraki (JP); Hiromichi Nakata, Ibaraki (JP); Kenichi Hamada, Ibaraki (JP); Kazushige Ishiura, Ibaraki (JP)

(73) Assignee: Kuraray Co., Ltd., Okayama (JP)

( * ) Notice: Subject to any disclaimer, the term of this patent is extended or adjusted under 35 U.S.C. 154(b) by 0 days.

(21) Appl. No.: 10/181,321

(22) PCT Filed: Nov. 20, 2001

(86) PCT No.: PCT/JP01/10122

§ 371 (c)(1), (2), (4) Date: Jul. 17, 2002

(87) PCT Pub. No.: WO02/40611

PCT Pub. Date: May 23, 2002

(65) Prior Publication Data

US 2003/0050395 A1 Mar. 13, 2003

(30) Foreign Application Priority Data

Nov. 20, 2000 (JP) ........................................ 2000-352696
Jun. 22, 2001 (JP) ........................................ 2001-189762

(51) Int. Cl.$^7$ ........................ C08F 297/04; C09J 125/10
(52) U.S. Cl. .......................... 525/314; 525/98; 525/271; 524/575; 156/334
(58) Field of Search ........................... 524/575; 525/98, 525/271, 314; 156/334

(56) References Cited

U.S. PATENT DOCUMENTS 3,427,269 A    2/1969  Davis et al.
3,825,623 A *  7/1974  La Flair ...................... 525/314
3,925,512 A * 12/1975  Roest et al. ................. 525/314
4,097,557 A *  6/1978  Cunningham ................ 525/314

FOREIGN PATENT DOCUMENTS

| JP | 45-41518    | 12/1970 |
| JP | 56-49958    | 11/1981 |
| JP | 01-188550   | 7/1989  |
| JP | 02-153968   | 6/1990  |
| JP | 06-228522   | 8/1994  |
| JP | 07-118335   | 5/1995  |

OTHER PUBLICATIONS

English language translation of JP 56–049958, published 05/1975.*

English language translation of JP 02–153986, published 06/1990.*

Fetters and Morton, *Macromolecules* 2(5): 453–458 (1969).

Mistrali and Gargani, *Kautschuk + Gummi Kunststoffe* 37:377–379 (1984).

Gandini et al., *Polymer Bulletin* 12: 71–77 (1984).

\* cited by examiner

*Primary Examiner*—Fred Teskin
(74) *Attorney, Agent, or Firm*—Wolf, Greenfield & Sacks, P.C.

(57) ABSTRACT

The present invention provides an adhesive composition containing a block copolymer, wherein the block copolymer has a polymer block (A) which is principally composed of a α-methyl styrene unit, and a polymer block (B) which is principally composed of a conjugated diene unit and of which at least part of carbon-carbon unsaturated double bonds may be hydrogenated, and having a good holding power at high temperatures.

10 Claims, No Drawings

US 6,806,317 B2

PRESSURE-SENSITIVE ADHESIVE/ ADHESIVE AND BLOCK COPOLYMER SUITABLE FOR USE THEREIN

RELATED APPLICATIONS

This application is a national stage filing under 35 U.S.C. § 371 of PCT application PCT/JP01/10122, filed Nov. 20, 2001.

TECHNICAL FIELD

The present invention relates to adhesive compositions and block copolymers suitable for them, and more particularly to adhesive compositions suitable for hot melt adhesive uses and block copolymers which may be suitably used for them.

BACKGROUND ART

As the base polymer of hot melt adhesives, various copolymers are used such as ethylene-vinyl acetate copolymers, block copolymers of styrene and conjugated diene and their hydrogenated products, ethylene-α-olefin copolymers, polyester resins, etc. Particularly, block copolymers comprising styrene and conjugated diene have a long open time and relatively well balanced adhesion and holding power; therefore, they are preferably being used in the adhesives for various disposable sanitary goods etc. and for surface protection films. For example, an adhesive composition based on a straight-chain block copolymer such as polystyrene-polybutadiene-polystyrene or polystyrene-polyisoprene-polystyrene is disclosed in JP, B, 45-41518 (corresponding U.S. Pat. No. 3,427,269). Also JP, B, 56-49958 discloses a hot melt adhesive composition utilizing (polystyrene-polybutadiene)nX branched-chain block copolymer.

However, the adhesive compositions containing a block copolymer composed of styrene and conjugated diene have a problem in their cohesion (holding power) in high temperature conditions, which is caused by the fact that the glass transition temperature (Tg) of the polystyrene block, which is the base polymer of the block copolymer, is as low as about 100° C., and there is a strong desire for improving the cohesion (holding power) of these adhesive compositions.

DISCLOSURE OF THE INVENTION

The object of the present invention is to solve the above described problem providing an adhesive composition having good holding power, and a block copolymer suitable for the same.

The inventors of the present invention have conducted eager investigations to solve the above described problem and found that the problem may be solved by utilizing an adhesive composition containing a block copolymer composed of α-methyl styrene and a conjugated diene; thereby they have eventually completed the present invention.

Accordingly, the present invention relates to an adhesive composition containing a block copolymer, wherein the block copolymer has a polymer block (A) which is principally composed of a α-methyl styrene unit, and a polymer block (B) which is principally composed of a conjugated diene unit and of which at least part of the carbon-carbon unsaturated double bonds may be hydrogenated.

The present invention also relates to the above described adhesive composition wherein the conjugated diene unit in the polymer block (B) is principally a 1,3-butadiene unit.

The present invention further relates to the above described adhesive composition, characterized in that the block copolymer has (1) a polymer block (A) which has a number-average molecular weight of 1,000 to 300,000 and (2) a polymer block (B) including: a polymer block (b1) which has a number-average molecular weight of 500 to 10,000 and of which 1,4-bond content is less than 30%; and a polymer block (b2) which has a number-average molecular weight of 10,000 to 400,000 and of which 1,4-bond content is not less than 30%, and in that the block copolymer has at least one (A-b1-b2) structure.

The present invention also relates to the above described adhesive composition, characterized in that the block copolymer includes at least one (A-b1-b2) structure obtained by:

(1) forming a polymer block (A) by polymerizing α-methyl styrene of 5 to 50% by weight concentration at a temperature from −30° C. to 30° C. in the presence of a polar compound of 0.1 to 10% by weight concentration using a organic lithium compound as an initiator in a nonpolar solvent; then (2) forming a polymer block (b1) by polymerizing 1 to 100 mol equivalent of conjugated diene with respect to living poly-α-methyl styryl lithium; and thereafter (3) forming a polymer block (b2) by polymerizing remaining conjugated dienes at a temperature higher than 30° C.

The present invention further relates to the above described adhesive composition wherein the conjugated diene unit in the polymer block (B) is principally a 1,3-butadiene unit and/or an isoprene unit.

The present invention also relates to the above described adhesive composition, wherein the conjugated diene unit in the polymer block (B) is principally a 1,3-butadiene unit.

The present invention further relates to the above described adhesive composition, wherein at least part of the carbon-carbon unsaturated double bonds of the polymer block (B) are hydrogenated.

The present invention also relates to a block copolymer, having a polymer block (A) which is principally composed of a α-methyl styrene unit, and a polymer block (B) which is principally composed of a conjugated diene unit and of which at least part of the carbon-carbon unsaturated double bonds may be hydrogenated, wherein said block copolymer includes:

(1) a polymer block (A) of a number-average molecular weight of 1,000 to 300,000; and (2) a polymer block (B) including: a polymer block (b1) which has a number-average molecular weight of 500 to 10,000 and of which 1,4-bond content is less than 30%; and a polymer block (b2) which has a number-average molecular weight of 10,000 to 400,000 and of which 1,4-bond content is not less than 30%, and said block copolymer includes at least one (A-b1-b2) structure.

The present invention further relates to the above block copolymer, wherein the conjugated butadiene units forming the block b1 and the block b2 are 1,3-butadiene unit and/or isoprene unit.

The present invention also relates to the above described block copolymer, wherein each of the conjugated diene units forming the block b1 and the block b2 is 1,3-butadiene unit.

And the present invention relates to the above described block copolymer, wherein at least part of the carbon-carbon unsaturated double bonds resulting from the conjugated diene unit of the polymer block (B) are hydrogenated.

BEST MODE FOR CARRYING OUT THE INVENTION

The polymer block (A) of the block copolymer forming the adhesive composition of the present invention is principally composed of a α-methyl styrene unit. To improve the holding power of the adhesive composition to be produced, the content of α-methyl styrene unit within the polymer block (A) is preferably not less than 50% by weight, more preferably not less than 70% by weight, and still more preferably not less than 90% by weight.

The polymer block (A) of the block copolymer of the present invention may be copolymerized with other monomers within the scope of not compromising the spirit of the present invention. Out of those which are capable of anionic polymerization, such monomers include, though will not be limited to, vinyl aromatic compounds such as styrene, o-methyl styrene, m-methyl styrene, p-methyl styrene, 1,3-dimethyl styrene, and diphenyl ethylene; and conjugated dienes such as 1,3-butadiene, isoprene, and 2,3-dimethyl-1, 3-butadiene. Particularly preferable are styrene, p-methyl styrene, 1,3-butadiene, and isoprene.

There is no limitation on the form of copolymerization in which the polymer block (A) is copolymerized with other monomers; it may be either a random form or a tapered form.

Examples of the conjugated dienes forming the polymer block (B) of the block copolymer constituting the adhesive composition of the present invention include conjugate dienes such as 1,3-butadiene, isoprene, and 2,3-dimethyl-1, 3-butadiene. These may be used either individually or combining more than two kinds. Out of these conjugated dienes, 1,3-butadiene and isoprene are preferable, and particularly 1,3-butadiene is preferable.

Moreover, the polymer block (B) may be copolymerized with a monomer other than conjugated diene compounds, which is capable of anionic polymerization, excepting α-methyl styrene. There is no limitation on the form of copolymerization, and it may be a random form or a tapered form. When α-methyl styrene that remained during the preceding polymerization of the polymer block (A) is copolymerized with a conjugated diene compound during the polymerization of the polymer block (B), that will reduce the holding power of the product and, thus, the present invention may not take effect. Therefore, it is preferable that conjugated diene compounds and α-methyl styrene are substantially not copolymerized.

Moreover, although the structure of the block copolymer used in the present invention is not limited to a straight-chain form, a branched form, or others; out of those, preferable structures include A-B-A triblock copolymer, a mixture of A-B-A triblock copolymer and A-B diblock copolymer, A-B-A-B tetrablock copolymer, and (A-B)nX star-shape copolymer (X represents the residual group of coupling agent). These block copolymers may be used individually or as a mixture of more than 2 kinds.

Further, the block copolymer may be copolymerized with other polymer block (C) to the extent that would not compromise the spirit of the present invention and, thus block copolymers with different structures may include A-B-C triblock copolymers, A-B-C-A tetrablock copolymers, and A-B-A-C tetrablock copolymers.

Moreover, the block copolymer is preferably hydrogenated in view of the improvement of adhesion, thermal degradation resistance, weatherability, etc. of the adhesive composition of the present invention. Although there is no limitation on the degree of hydrogenation, it is preferable that at least not less than 30% of the whole carbon-carbon unsaturated double bonds resulting from the conjugated dienes in the block copolymer is hydrogenated, and preferably not less than 50% and more preferably not less than 80%.

Further, unless the spirit of the present invention is not compromised, the block copolymer may contain a functional group such as carboxyl group, hydroxyl group, acid anhydride group, amino group, and epoxy group in the molecular chain or at the molecular terminals.

As the process for preparing the block copolymer used in the present invention, an anionic polymerization may be used and practical examples are shown below.

The examples include: (1) a process for preparing an A-B-A block copolymer by successively polymerizing α-methyl styrene at a temperature of −78° C. after the polymerization of conjugated diene in a tetrahydrofuran solvent using a dianion-type initiator (Macromolecules, (1969), 2 (5), 453–458); (2) a process for preparing a (A-B)nX type block copolymer in which α-methyl styrene is polymerized in bulk using an anionic initiator, and then conjugated dienes are successively polymerized and thereafter a coupling reaction was conducted with a coupling agent such as tetrachlorosilane (Kautsch. Gummi, Kunstst., (1984), 37(5), 377–379; Polym. Bull., (1984), 12, 71–77); (3) a process for preparing an A-B-A type block copolymer by adding a coupling agent after polymerizing a conjugated diene with a living polymer which is obtained by polymerizing α-methyl styrene of a concentration of 5 to 50% by weight at a temperature from −30° C. to 30° C. in the presence of a polar compound of a concentration of 0.1 to 10% by weight using an organic lithium compound as an initiator in a non-polar solvent; or (4) a process for preparing an A-B-C type block copolymer by polymerizing an anionically polymerizable monomer excepting α-methyl styrene with a living polymer of block copolymer composed of a α-methyl styrene polymer block and a conjugated diene polymer block, the living polymer of block copolymer being formed by successively polymerizing conjugated diene with a living polymer which is obtained by polymerizing α-methyl styrene of a concentration of 5 to 50% by weight at a temperature from −30° C. to 30° C. in the presence of a polar compound of a concentration of 0.1 to 10 % by weight using an organic lithium compound as an initiator in a nonpolar solvent.

Of the above described processes for preparing block copolymers, processes (3) and (4) are preferable, and particularly process (3) is more preferably adopted.

The above described process (3) will be described in more detail below.

In the above described process, examples of the organic lithium compound used as the polymerization initiator include mono lithium compounds, such as n-butyl lithium, sec-butyl lithium, and tert-butyl lithium, and dilithium compounds such as tetraethylene dilithium. These compounds may be used individually or in conjunction with more than two kinds.

The solvent used for the polymerization of α-methyl styrene is a nonpolar solvent including, for example, aliphatic hydrocarbons such as cyclohexane, methylcyclohexane, n-hexane, and n-heptane and aromatic hydrocarbons such as benzene, toluene, xylene. These may be used either individually or in conjunction with more than two kinds.

The polar compound used during polymerization of α-methyl styrene is a compound which has no functional group (hydroxyl group, carbonyl group, etc.) reacting with anionic species and has heteroatoms such as oxygen atom and nitrogen atom within the molecule, examples of which include diethyl ether, monoglime, tetramethylethylenediamine, dimethoxyethane, tetrahydrofuran. These compounds may be used either individually or in conjunction with more than two kinds.

The concentration of polar compound in a reaction system is preferably within a range of 0.1 to 10% by weight, and more preferably in a range of 0.5 to 3% by weight in view of the control of the 1,4-bond content of conjugated diene polymer block when polymerizing the conjugated diene after polymerizing α-methyl styrene at a high conversion ratio.

The concentration of α-methyl styrene in there action system is preferably in a range of 5 to 50% by weight, and more preferably 10 to 40% by weight, and still more preferably 25 to 40% by weight in view of polymerizing α-methyl styrene at a high conversion ratio and the viscosity of the reaction solution in the later stage of the polymerization.

The above mentioned conversion ratio of polymerization represents a ratio of α-methyl styrene converted from non-polymerized state into a block copolymer through polymerization and, in the present invention, the conversion ratio is preferably not less than 70% and more preferably not less than 85%.

The temperature condition during the polymerization of α-methyl styrene is preferably in a range of −30° C. to 30° C., more preferably −20° C. to 10° C., and even more preferably −15° C. to 0° C. in view of the ceiling temperature (the temperature at which the polymerization reaches an equilibrium without further reaction), and the polymerization speed of α-methyl styrene and a life time of α-methyl styryl anion. By setting the polymerization temperature not to exceed 30° C., it is possible to polymerize α-methyl styrene at a high conversion ratio and also to keep the ratio of the deactivation of the generated living polymer at a minimum so that mixing of homopoly-α-methyl styrene into the block copolymer to be produced is prevented thus avoiding the degradation of its physical properties. Also, keeping the polymerization temperature not lower than −30° C. allows the reaction solution to be stirred without increasing its viscosity during the latter stage of the polymerization of α-methyl styrene, thus minimizing the expenses for maintaining the low temperature condition; therefore, this is also economically preferable.

In the above described process, other aromatic vinyl compounds may be copolymerized with α-methyl styrene by allowing them to coexist during the polymerization of α-methyl styrene unless the physical properties of the α-methyl styrene polymer block is compromised. The aromatic vinyl compounds include, for example, styrene, o-methyl styrene, m-methyl styrene, p-methyl styrene, 1,3-dimethyl styrene, vinyl naphthalene, vinyl anthracene, etc. The aromatic vinyl compounds may be used either individually or in combination of more than two kinds.

When α-methyl styrene is polymerized using organic lithium as an initiator, living poly-α-methyl styryl lithium is generated and, in the following step, a conjugated diene is polymerized with this.

The conjugated diene includes, for example, 1,3-butadiene, isoprene, 2,3-dimethyl-1,3-butadiene, 1,3-pentadiene, 1,3-hexadiene, etc., and these compounds may be used either individually or in combination of more than two kinds. of these conjugated dienes, preferable is 1,3-butadiene or isoprene. Although these may be used as a mixture, particularly 1,3-butadiene is preferable.

The conjugated diene is used for polymerization by adding it to a reaction system. There is no particular limitation on the method for adding the conjugated diene to a reaction system; it may be added to a living poly-α-methyl styryl lithium solution either directly or by diluting with a solvent. The addition of the conjugated diene by diluting with a solvent may be carried out by diluting the mixture with the solvent after adding the conjugated diene, or by adding the conjugated diene and the solvent at the same time, or by adding the conjugated diene after diluting it with the solvent. To be recommended are processes of adding preferably 1 to 100 mol equivalent, or more preferably 5 to 50 mol equivalent of conjugated diene to living poly-α-methyl styryl lithium to modify the activated terminals of the living polymer, thereafter diluting the mixture with a solvent, and adding the rest of the conjugate butadiene to polymerize at a temperature higher than 30° C., preferably 40° C. to 80° C.

The solvents which may be used for the dilution process include, for example, aliphatic hydrocarbon such as cyclohexane, methylcyclohexane, n-hexane, and n-heptane; and aromatic hydrocarbons such as benzene, toluene, and xylene. These solvents may be used either individually or in combination of more than two kinds.

In a block copolymer comprising a α-methyl styrene polymer block and a conjugated diene polymer block, part or all of the carbon-carbon unsaturated double-bonds of the block copolymer are preferably hydrogenated since its heat resistance and wetherability are improved.

A triblock or radial teleblock type block copolymer can be prepared by making, for example, a multifunctional coupling agent react with a living polymer of block copolymer comprising α-methylstyrene polymer block and conjugated diene polymer block, which is obtained by copolymerizing living poly-α-methyl styryl lithium and conjugated diene. In this case, the block copolymer may be a mixture containing diblock, triblock, and radial-teleblock type block copolymers in an arbitrary composition, which are obtained by adjusting the usage of the multifunctional coupling agent. Examples of the multifunctional coupling agent include phenyl benzoate, methyl benzoate, ethyl benzoate, methyl acetate, ethyl acetate, methyl pivalate, ethyl pivalate, phenyl pivalate, α,α'-dichloro-o-xylene, α,α'-dichloro-m-xylene, α,α'-dichloro-p-xylene, bis(chloromethyl)ether, dibromomethane, diiodemethane, dimethyl phthalate, dichlorodimethylsilane, dichlorodiphenylsilane, trichloromethylsilane, tetrachlorosilane, divinylbenzene, etc.

To hydrogenate a triblock or radial-teleblock type block copolymer obtained through the reaction of a living polymer of a block copolymer, which comprises a α-methyl styrene polymer block and a conjugated diene polymer block, with a multifunctional coupling agent, active hydrogen compounds such as alcohols, carboxylic acids, and water may be added to halt the coupling reaction as desired, and thereafter may be hydrogenated in an inactive organic solvent under the presence of a hydrogenation catalyst according to a known method to obtain a hydrogenated block copolymer.

In the case of the hydrogenation of a block copolymer comprising a α-methyl styrene polymer block and a conjugated diene polymer block, living poly-α-methyl styryl lithium is polymerized with a conjugated diene, and thereafter active hydrogen compounds such as alcohols, carboxylic acids, water, etc are added to halt the polymerization reaction and hydrogenation is conducted in an inactive organic solvent under the presence of a hydrogenation catalyst according to a known method to obtain a hydrogenated block copolymer.

In the case of a non-hydrogenated block copolymer comprising a α-methyl styrene polymer block and a conjugated diene polymer block; or a non-hydrogenated ABC type triblock copolymer obtained by polymerizing a block copolymer, comprising a α-methyl styrene polymer block and a conjugated diene polymer, with an anionically polymerizable monomer; or a non-hydrogenated triblock or radial-teleblock type block copolymer obtained through the reaction of a living polymer of a block copolymer comprising a α-methyl styrene polymer block and a conjugated diene polymer block with a multifunctional coupling agent, they may be subjected to hydrogenation without substituting the solvent used for their preparation.

The hydrogenation reaction may be conducted under the conditions of, for example, a reaction temperature of 20° C. to 100° C. and a hydrogen pressure of 1 to 100 kg/cm$^2$ under the presence of a hydrogenation catalyst such as Ziegler catalyst consisting of an alkyl aluminum compound and cobalt, nickel, or others.

It is preferable to hydrogenate a non-hydrogenated block copolymer until 90% or more of unsaturated double bonds in the conjugated diene polymer block are saturated, thus improving the weatherability of the block copolymer. The degree of hydrogenation of the unsaturated double bonds in the conjugated diene polymer block in a hydrogenated block copolymer is determined by use of analysis means such as iodine value titration method, infrared spectroscopic analysis, and nuclear magnetic resonance spectrum measurement ($^1$H-NMR spectrum).

The number-average molecular weight (polystyrene conversion) of the α-methyl styrene polymer block of the non-hydrogenated or hydrogenated block copolymer (α-methyl styrene block copolymer) prepared by the above described process is preferably, 1000 to 300,000 and more preferably 3,000 to 100,000, and the 1,4-bond content of conjugated diene polymer block is preferably 10 to 80%.

The number-average molecular weight (polystyrene conversion) of the block copolymer used in the present invention may be adjusted depending on the uses and, in general, it is preferably 10,000 to 2,000,000 and more preferably 15,000 to 1,000,000.

The block copolymer used in the present invention is preferably the one obtained by the above described method, and particularly, in view of adhesion property, it is preferable to form a polymer block (A) by polymerizing α-methyl styrene of a 5 to 50 wt % concentration at a temperature of −30° C. to 30° C. under the presence of a polar compound of 0.1 to 10 wt % concentration by using an organic lithium compound in a nonpolar solvent as the initiator, and then forming a polymer block (b1) by polymerizing conjugated diene of 1 to 100 mol equivalent weight with respect to living poly-α-methyl styryl lithium, and thereafter forming a polymer block (b2) by polymerizing the remaining conjugated diene at a temperature higher than 30° C.

The structure of the above described block copolymer is not limited to either a straight chain type or a branched type, and is preferably a block copolymer having at least one (A-b1-b2) structure such as, for example, A-b1-b2-b2-b1-A type copolymer, a mixture of A-b1-b2-b2-b1-A type copolymer and A-b1-b2 type copolymer, and (A-b1-b2)nX type (X represents remaining groups of the coupling agent, and n is a whole number more than two). At least part of the carbon-carbon unsaturated double bonds resulting from the conjugated dienes in the blocks b1 and b2 are preferably hydrogenated.

The number-average molecular weight (polystyrene conversion) of the polymer block (A) in the above described block copolymer is preferably 1,000 to 300,000 and more preferably 3,000 to 100,000.

Moreover, the number-average molecular weight (polystyrene conversion) in the polymer block (b1) of the above described block copolymer is preferably 500 to 10,000, and more preferably 1,000 to 7,000, and the 1,4-bond content of the polymer block (b1) is preferably less than 30%.

The number-average molecular weight (polystyrene conversion) of the polymer block (b2) in the above described block copolymer is preferably 10,000 to 400,000 and more preferably 15,000 to 200,000. And the 1,4-bond content of the polymer block (b2) is preferably more than 30%, more preferably 35 to 95%, and even more preferably 40 to 80%.

Next, tackifying resins which may be used for the adhesive compositions of the present invention are resins which have been traditionally used as the tackifying resin for adhesive compositions; examples of which include indenechroman resin, phenol resin, para-tert-butylphenol acetylene resin, phenol formaldehyde resin, polyterpene resin, xyleneformaldehyde resin, synthetic polyterpene resin, aromatic hydrocarbon resin, aliphatic cyclic hydrocarbon resin, oligomer such as mono-olefin and di-olefin, hydrocarbon resins, hydrogenated hydrocarbon resins, polybutene, polyalcohol ester of rosin, hydrogenated rosin, hydrogenated wood rosin, ester between hydrogenated rosin and monoalcohol or polyalcohol, turpentine tackifying resin.

Particularly preferable tackifying resins include terpene resins, syntheticterpeneresin, aromatic denature terpeneresin, aliphatic saturated petroleum resins, rosin ester, disproportionate rosin ester, hydrogenated rosin ester, aliphatic petroleum resins (C5 aliphatic petroleum resin, C5/C9 aliphatic petroleum resin, etc.), modified aliphatic petroleum resins, etc.

There is no particular limitation on the loading of the above described tackifying resins within the scope in which the object of the present invention is not compromised; the loading is preferably 40 to 1,000 parts by weight with respect to 100 parts of the block copolymer, and more preferably 100 to 500 parts by weight. The tackifying resins may be used individually or in combination of more than two kinds.

Next, the softeners which may be used for the adhesive composition of the present invention include petroleum softeners such as paraffin, naphthenic, and aroma process oils, paraffins, vegetable oil softeners, plasticizers; these may be used individually or as a mixture of more than two kinds.

There is no limitation on the amount of softening agent unless the spirit of the present invention is compromised, but it is 0 to 1000 parts by weight, preferably 0 to 500 parts by weight, and more preferably 50 to 300 parts by weight with respect to 100 parts by weight of the block copolymer.

Further, the adhesive composition of the present invention may be added with additives such as phenolic stabilizers, sulfur stabilizers, phosphorus stabilizers, light stabilizers, antistatic agents, mold release agents, flame retardants, foaming agents, pigments, dyestuff, brightening agents, carbon fibers. Practical examples of the stabilizer include phenolic stabilizers such as 2,6-di-tert-butyl-para-cresol, pentaerystyril-tetrakis[3-(3,5-di-tert-butyl-4-hydroxyphenyl)propionate], 1,3,5-trimethyl-2,4,6-tris(3,5-di-tert-butyl-4-hydroxybenzyl)benzene, octadecyl-3-(3,5-di-tert-butyl-4-hydroxyphenyl)propionate, triethylene glycol-bis[3-(3-tert-butyl-5-methyl-4-hydroxyphenyl) propionate, 2,4-bis-(n-octylthio)-6-(4-hydroxy-3,5-di-tert-butylanilino)-1,3,5-triazine, 2,2-thio-diethylenebis[3-(3,5-di-tert-butyl-4-hydroxyphenyl)propionate], N,N'-hexamethylenebis(3,5-di-tert-butyl-4-hydroxy-hydrodiamide, 3,5-di-tert-butyl-4-hydroxy-benzylphosphonate-diethylester, toris-(3,5-di-tert-butyl-4-hydroxybenzyl)-isocyanurate, 3,9-bis{2-[3-(3-tert-butyl-4-hydroxy-5-methylphenyl)propionyloxy]-1,1-dimethylethyl}-2,4,8,10-tetraoxaspiro[5,5]undecane; sulfur stabilizers such as pentaerystyryl tetrakis(3-laurylthiopropionate), distearyl 3,3,-thiodipropionate, dilauryl 3,3,-thiodipropionate, dimyristyl 3,3'-thiodipropionate; and phosphorous stabilizers such as trisnonylphenylphosphite, toris(2,4-di-tert-butylphenyl) phosphite, distearyl-pentaerythritol-diphosphite, bis(2,6-di-tert-butyl-4-methylphenyl)pentaerythritol-diphosphite. These stabilizers may be used either individually or in combination.

Moreover, in the present invention, reinforcing resins may be used for the adhesive composition including polystyrene, polyethylene, polypropylene, ethylene-propylene copolymer, ethylene-butene copolymer, ethylene-vinyl acetate copolymer, and resins having a relatively low molecular weight such as thermoplastic polyester resins, polyamide resin, polyphenylene ether resin, etc.

Moreover, in the adhesive composition in the present invention, other elastomers may be used as the additive, which include natural rubber, synthetic polyisoprene rubber, liquid polyisoprene rubber and its hydrogenated products, polybutadiene rubber, liquid polybutadiene rubber and its hydrogenated products, styrene-butadiene rubber, chloroprene rubber, ethylene-propylene rubber, acryl rubber, polyisoprene isobutylene rubber, acrylonitrile-butadiene rubber, or styrenic elastomers such as polystyrene-polyisoprene-polystyrene and polystyrene-polybutadiene-polystyrene, or their hydrogenated products i.e., hydrogenated styrenic elastomers.

The adhesive composition of the present invention may be added with inorganic fillers in the extent to which its properties are not compromised. Examples of such inorganic fillers include talc, calciumcarbonate, silica, glass fibers, mica, kaoline, and titanium oxides.

The process for preparing the adhesive composition of the present invention may be selected from any typical processes and, for example, the adhesive composition may be prepared by kneading or mixing the above described necessary components in a molten state at a temperature in a range of 130° C. to 230° C. in a nitrogen gas atmosphere when desired using, for example, a typical bath-type mixer, a high-speed stirrer, an enclosed kneader, an internal mixer, or an extrusion machine such as a single-screw extruder and a twin-screw extruder. The adhesive composition of the present invention which is obtained by mixing the above described components may be prepared in an appropriate form depending on the purpose and mode of its use, i.e., it may be in the form of, for example, a block, a granule, a flake, a pellet, a bar, film, sheet, etc. for each application of various adhesive products.

The adhesive composition of the present invention may be prepared as a solvent type adhesive composition by dissolving the solid components in an aliphatic solvent such as heptane, isopentane, n-hexane, cyclohexane; and aromatic solvents such as benzene, xylene, toluene, and ethylbenzene so that generally the consentration of the solids content is about 5 to 70% depending on the uses.

Moreover, there is no limitation on the uses of the adhesive composition of the present invention and, as with conventional hot melt type adhesives and pressure sensitive adhesives, it may be used as the adhesive composition for various materials, for example, plastic films and sheet such as polyethylene, polypropylene, and poly ester; paper; wood; fabrics; metal foil; and leather goods. More particularly, the adhesive composition of the present invention may be used in, for example, packages such as bag making, seals for small boxes and corrugated boxes, pickups for labels, the manufacture of aluminum foil cans, etc.; book binding; plywood manufacturing; woodworking; the manufacture of textile fabrics such as shoemaking, carpet backing, and nonwoven fabric binders; the manufacture of various sanitary supplies such as paper diapers, sanitary napkins, and others; adhesive tapes for packaging; electrical insulation tapes and films; adhesive tapes and sheets for surface protection of various commodities; various adhesive films and sheets used in the semiconductor wafer processing; binding and fixing of pipes or the like; sealing materials for use in building materials such as window sash, and automobile lamp and instrument panel assemblies, etc.; and adhesives for labels.

When the adhesive composition of the present invention is used as a hot melt adhesive, bonding can be carried out using a conventional applicator for hot melt adhesives by melting the hot melt adhesive composition by heating, applying it to adherends, and then solidifying the adhesive in a state that the two adherends are laminated (or pressed together).

When the adhesive composition of the present invention is used as a hot melt type pressure sensitive adhesive composition, adhesive films, adhesive sheets, and other products of the adhesive composition can be prepared by applying a hot melt pressure sensitive adhesive composition in a molten state onto one or both surfaces of the base material such as paper, cloth, plastic film or sheet, and metal foil to form a layer of the pressure sensitive adhesive composition on the base material.

In either case in which the adhesive composition is a hot melt adhesive composition or a hot melt pressure sensitive adhesive composition, the adhesive composition of the present invention can be easily melted generally by heating to a temperature of about 120° C. to 200° C., thus allowing smooth bonding work as well as smooth manufacturing of adhesive products such as adhesive films owing to its improved workability.

EXAMPLES

The present invention will be described in more detail below referring to practical examples, to which the present invention is not intended to be limited.

The performance evaluation of the adhesive composition is conducted in the following way.

Adhesion

The adhesion of the adhesive composition was evaluated by a 180-degree peel test in accordance with JIS Z-0237. Specifically, a prepared adhesive tape was cut into a 25 mm wide and 100 mm long piece and adhered onto a polyethylene sheet of about 1 mm thickness and a stainless steel (SUS 304) plate, and the measurement was made by peeling the specimen in the conditions of a peel angle of 180 degrees, at a peel speed of 30 cm/min, and at a temperature of 25° C.

Holding Power

The holding power of the adhesive composition was evaluated in accordance with JIS Z-0237. Specifically, a prepared adhesive tape was cut into a 25 mm by 25 mm piece and adhered onto a stainless (SUS304) plate, and a load of 1 kg was suspended from the specimen at an environment temperature of 60° C. or 80° C. and the holding power was determined from a fall time in which the load fell off the specimen. For the specimens in the case of which the load did not fall in 240 minutes, the holding power was determined from the slippage of the adhesive tape after 240 minutes.

Reference Example 1

Preparation of Hydrogenated Block Copolymer

After purging a pressure vessel having a stirrer with nitrogen gas, fully dewatered α-methyl styrene, cyclohexane, n-hexane, and tetrahydrofuran were charged into the vessel in the amounts of 172 g, 258.1 g, 28.8 g, and 5.9 g respectively. Then 11.2 ml of sec-butyl lithium (1.3 M, cyclohexane solution) was added and polymerization was conducted for 5 hours at −10° C. After the 5 hours polymerization, the number-average molecular weight of poly α-methyl styrene was measured by a gel permeation chromatography (hereinafter abbreviated as GPC), and the result was 10,000 based on polystyrene conversion, and the conversion ratio of polymerization of α-methyl styrene was analyzed by gas chromatograph to be 90%. Then, 27 g of 1,3-butadiene was added, and after stirring for 30 minutes, 1,703 g of cyclohexane was added. The polymerizing conversion ratio of a-methyl styrene at this moment was 90% and the number-average molecular weight of 1,3-butadinen block (b1) (GPC measurement, polystyrene conversion) was 3,640 and the 1,4-bond content determined by $^1$H-NMR measurement was 22%. Next, 303 g of 1,3-butadiene was added and polymerization was conducted for 2 hours while raising the temperature to 60° C.

Further, 17.3 ml of α,α-dichloro-p-xylene(0.3 M, toluene solution) was added and the mixture was stirred for an hour at 60° C. to synthesize poly( a-methyl styrene)-polybutadiene-poly(α-methyl styrene) type copolymer (hereinafter abbreviated as SBmS-1) through a coupling reaction.

The molecular property of the obtained mSBmS-1 was determined with GPC and $^1$H-NMR spectrum analysis. The results are shown in Table 1.

The number-average molecular weight (GPC measurement, polystyrene conversion) of 1,3-butadiene block (b2), which was polymerized by raising the temperature in the polybutadiene block, was 43,400 and the 1,4-bond content ($^1$H-NMR analysis) was 62%.

Also the composition analysis by $^1$H-NMR spectrum measurement has revealed that the 1,4-bond content of the entire polybutadiene block B was 59% and also α-methyl styrene was substantially not copolymerized in the polybutadiene block B.

Further, after fully purging with nitrogen gas, the obtained polymerization solution of the mSBmS-1 was subjected to hydrogenation reaction for 5 hours at 80° C. in hydrogen atmosphere using a Ni/Al Ziegler hydrogenated catalyst to obtain a poly(α-methyl styrene)-hydrogenated polybutadiene-poly(α-methyl styrene) type copolymer (hereinafter abbreviated as HmSBmS-1). The degree of hydrogenation of the obtained HmSBmS-1 was determined by $^1$H-NMR spectrum measurement and the results are shown in Table 1.

Reference Example 2

Preparation of Block Copolymer

After purging a pressure vessel having a stirrer with nitrogen gas, fully dewatered α-methyl styrene, cyclohexane, methylcyclohexane, and tetrahydrofuran were charged into the vessel in the amounts of 172 g, 251 g, 47.3 g, and 5.9 g respectively. Then 16.8 ml of sec-butyl lithium (1.3 M, cyclohexane solution) was added and polymerization was conducted for 5 hours at −10° C. After the 5 hours polymerization, the number-average molecular weight of poly α-methyl styrene measured by GPC was 7,100 based on polystyrene conversion, and the conversion ratio of polymerization of α-methyl styrene was analyzed by gas chromatograph to be 92%. Then, 35.4 g of 1,3-butadiene was added and stirred for 30 minutes, and thereafter 1,680 g of cyclohexane was added. The conversion ratio of polymerization of α-methyl styrene at this moment was 92%, the number-average molecular weight of 1,3-butadiene block (b1) (GPC measurement, polystyrene conversion) being 3,350 and the 1,4-bond content determined by $^1$H-HMR measurement being 16%. Next, 310 g of 1,3-butadiene was added and polymerization was conducted for 2 hours while raising the temperature up to 60° C.

At this stage, part of the polymerization solution was drawn out and polymerization was halted by means of methanol to obtain poly(α-methyl styrene)-polybutadiene type copolymer (hereinafter abbreviated as mSB).

Further, 21.8 ml of α,α'-dichloro-p-xylene(0.5 M, toluene solution) was added to the polymerization solution in the pressure vessel and stirred for an hour at 60° C. to synthesize poly(α-methyl styrene)-polybutadiene-poly(α-methyl styrene) type copolymer (hereinafter abbreviated as mSBmS) through a coupling reaction. The molecular properties of the obtained mSB and mSBmS were determined with GPC and $^1$H-NMR spectrum analysis. The results are shown in Table 1. As for 1,3-butadiene block (b2) which was polymerized by raising the temperature in the polybutadiene block, its number-average molecular weight (GPC measurement, polystyrene conversion) was 29,300 and the 1,4-bond content ($^1$H-NMR analysis) was 61%.

Also the composition analysis by $^1$H-NMR spectrum measurement has revealed that the content of 1,4-bond of the entire polybutadiene block B was 44% and also α-methyl styrene was substantially not copolymerized in the polybutadiene block B.

Reference Example 3

Preparation of Hydrogenated Block Copolymer

The cyclohexane solution of mSB synthesized in the reference example 2 was prepared and charged in a pressure vessel which was fully purged with nitrogen gas, and thereafter hydrogenation reaction was conducted for 5 hours at a temperature of 80° C. in hydrogen atmosphere using a Ni/Al Ziegler hydrogenated catalyst to obtain poly(α-methyl styrene)-hydrogenated polybutadiene type copolymer (hereinafter abbreviated as HmSB). The degree of hydrogenation of the obtained HmSB was determined by $^1$H-NMR spectrum measurement and the result is shown in Table 1.

Reference Example 4

Preparation of Hydrogenated Block Copolymer

The cyclohexane solution of mSBmS synthesized in the reference example 2 was prepared and charged in a pressure vessel which was fully purged with nitrogen gas, and thereafter hydrogenation reaction was conducted for 5 hours at a temperature of 80° C. in hydrogen atmosphere using a Ni/Al Ziegler hydrogenated catalyst to obtain a poly(α-methyl styrene)-hydrogenated polybutadiene-poly(α-methyl styrene) type copolymer (hereinafter abbreviated as HmSBmS-2). The degree of hydrogenation of the obtained HmSBmS-2 was determined by $^1$H-NMR spectrum measurement and the result is shown in Table 1.

Reference Example 5

Preparation of Hydrogenated Block Copolymer

After fully purging a pressure vessel having a stirrer with nitrogen gas, fully dewatered α-methyl styrene, cyclohexane, n-hexane, and tetrahydrofuran were charged into the vessel in the amounts of 172 g, 261.3 g, 28.7 g, and 5.9 g respectively. Then 12.5 ml of sec-butyl lithium (1.3 M, cyclohexane solution) was added and polymerization was conducted for 5 hours at −10° C. After the 5 hours polymerization, the number-average molecular weight of poly α-methyl styrene measured by GPC was 9,400 based on polystyrene conversion, and the conversion ratio of polymerization of α-methyl styrene analyzed by gas chromatograph was 87%. Then, 24.9 g of 1,3-butadiene was added and stirred for 30 minutes, and thereafter 876 g of cyclohexane and 11.2 g of tetrahydrofuran were added. The polymerization conversion ratio of α-methyl styrene at this moment was 87%, the number-average molecular weight of poly 1,3-butadiene block (b1) (GPC measurement, polystyrene conversion) being 3,500 and the 1,4-bond content determined by $^1$H-NMR measurement was 12%. Next, 323 g of 1,3-butadiene was added and polymerization was conducted for 2 hours while raising the temperature to 50° C.

Further, 26.1 ml of α,α'-dichloro-p-xylene(0.3 M, toluene solution) was added to the polymerization solution in the pressure vessel and stirred for an hour at 60° C. to synthesize poly(α-methyl styrene)-polybutadiene-poly(α-methyl styrene) type copolymer (hereinafter abbreviated as mSBmS) through a coupling reaction. The molecular property of the obtained mSBmS was determined by means of GPC and $^1$H-NMR spectrum analysis, and the results are shown in Table 1.

As for poly 1,3-butadiene block (b2) which was polymerized by raising the temperature in the polybutadiene block, its number-average molecular weight (GPC measurement, polystyrene conversion) was 47,100 and the 1,4-bond content ($^1$H-NMR analysis) was 20.3%.

Also the composition analysis by $^1$H-NMR spectrum measurement has revealed that the content of 1,4-bond of the entire polybutadiene block B was 19.8% and also α-methyl styrene was substantially not copolymerized in the polybutadiene block B.

Further, a cyclohexane solution of the obtained mSBmS was prepared and charged in a pressure vessel which was fully purged with nitrogen gas, and thereafter hydrogenation reaction was conducted for 5 hours at a temperature of 80° C. in hydrogen atmosphere using a Ni/Al Zeigler hydrogenated catalyst to obtain a poly(α-methyl styrene)-hydrogenated polybutadiene-poly(α-methyl styrene) type copolymer (hereinafter abbreviated as HmSBmS-3). The degree of hydrogenation of the obtained HmSBmS-3 was determined by $^1$H-NMR spectrum measurement and the result is shown in Table 1.

Reference Example 6

Preparation of Block Copolymer

After fully purging a pressure vessel having a stirrer with nitrogen gas, fully dewatered α-methyl styrene, cyclohexane, methylcyclohexane, and tetrahydrofuran were charged into the vessel in the amounts of 156 g, 227 g, 39.6 g, and 5.3 g respectively. Then 16.8 ml of sec-butyl lithium (1.3 M, cyclohexane solution) was added and polymerization was conducted for 5 hours at −10° C. After 5 hours polymerization, the number-average molecular weight of poly α-methyl styrene (GPC measurement, polystyrene conversion) was 6,400, and the conversion ratio of polymerization of α-methyl styrene was 92%. Then, 44.7 g of isoprene was added and stirred for 30 minutes, and thereafter 1,710 g of cyclohexane was added. The conversion ratio of polymerization of α-methyl styrene at this moment was 92% and the number-average molecular weight of polyisoprene block (b1) was 4,150 and the 1,4-bond content was 15%. Next, 315 g of isoprene was added and polymerization was conducted for 2 hours while raising the temperature to 60° C.

At this stage, part of polymerization solution was drawn out and polymerization was halted by means of methanol to obtain poly (α-methyl styrene) -polyisoprene type copolymer (hereinafter abbreviated as mSI).

Further, 21.8 ml of α,α'-dichloro-p-xylene(0.5 M, toluene solution) was added to the polymerization solution in the pressure vessel and stirred for an hour at 60° C. to synthesize poly(α-methyl styrene)-polyisoprene-poly(α-methyl styrene) type copolymer (hereinafter abbreviated as mSImS) through a coupling reaction. The molecular properties of the obtained mSI and mSImS were determined by means of GPC and $^1$H-NMR spectrum analysis. The results are shown in Table 1.

As for polyisoprene block (b2), which was polymerized by raising the temperature in the polyisoprene block, its number-average molecular weight was 29,200 and the 1,4-bond content was 46%.

Also the composition analysis by $^1$H-NMR spectrum measurement has revealed that the 1,4-bond content of the entire polyisoprene block B was 42% and also α-methyl styrene was substantially not copolymerized in the polyisoprene block B.

Reference Example 7

Preparation of Hydrogenated Block Copolymer

The cyclohexane solution of mSI synthesized in the reference example 6 was prepared and charged in a pressure vessel which was fully purged with nitrogen gas, and thereafter a hydrogenation reaction was conducted for 5 hours at a temperature of 80° C. in hydrogen atmosphere using a Ni/Al Ziegler hydrogenated catalyst to obtain a poly(α-methyl styrene)-hydrogenated polyisoprene type copolymer (hereinafter abbreviated as HmSI). The degree of hydrogenation of the obtained HmSI was measured by means of $^1$H-NMR spectrum analysis and is shown in Table 1.

Reference Example 8

Preparation of Hydrogenated Block Copolymer

The cyclohexane solution of mSImS synthesized in the reference example 6 was prepared and charged in a pressure vessel which was fully purged with nitrogen gas, and thereafter a hydrogenation reaction was conducted for 5 hours at a temperature of 80° C. in hydrogen atmosphere using a Ni/Al Ziegler hydrogenated catalyst to obtain a poly(α-methyl styrene)-hydrogenated polyisoprene-poly(α-methyl styrene) type copolymer (hereinafter abbreviated as HmSImS). The degree of hydrogenation of the obtained HmSImS was measured by means of $^1$H-NMR spectrum analysis and is shown in Table 1.

Reference Example 9

Preparation of Hydrogenated Block Copolymer

After fully purging a pressure vessel having a stirrer with nitrogen gas, fully dewatered α-methyl styrene, cyclohexane, methylcyclohexane, and tetrahydrofuran were charged into the vessel in the amounts of 183 g, 267 g, 46.6 g, and 6.3 g respectively. Then 14.1 ml of sec-butyl lithium (1.3 M, cyclohexane solution) was added and polymerization was conducted for 5 hours at −10° C. After the 5 hours polymerization, the number-average molecular weight of poly α-methyl styrene was 9,000, and the conversion ratio of polymerization of α-methyl styrene was 90%. Then, 34.3 g of a mixed monomer, which was blended in a composition of isoprene/1,3-butadiene=60/40 (by weight ratio) in advance, was added and stirred for 30 minutes, and thereafter 1,660 g of cyclohexane was added. The conversion ratio of polymerization of α-methyl styrene at this moment was 90% and the number-average molecular weight of poly(isoprene/1,3-butadienen) block (b1) was 4,650and the 1,4-bond content was 22%. Next, 301 g of the foregoing mixed monomer was added and polymerization was conducted for 2 hours while raising the temperature up to 60° C.

Further, 18.3 ml of α,α'-dichloro-p-xylene(0.5 M, toluene solution) was added to the polymerization solution in the pressure vessel and stirred for an hour at 60° C. to synthesize poly(α-methyl styrene)-poly(isoprene/1,3-butadiene)-poly (α-methyl styrene) type copolymer (hereinafter abbreviated as mS(I/B)mS) through a coupling reaction. The molecular property of the obtained mS(I/B)mS was determined by means of GPC and $^1$H-NMR spectrum analysis, and the results are shown in Table 1.

As for poly(isoprene/1,3-butadiene) block (b2) which was polymerized by raising the temperature in the poly(isoprene/

1,3-butadiene) block, its number-average molecular weight was 40,850 and the content of 1,4-bond was 62%.

Also the composition analysis by means of $^1$H-NMR spectrum measurement has revealed that the 1,4-bond content of the entire poly(isoprene/1,3-butadiene) block B was 58% and also α-methylstyrene was substantially not copolymerized in the poly(isoprene/1,3-butadiene) block B.

Further, a cyclohexane solution of the obtained mS(I/B)mS was prepared and charged in a pressure vessel which was fully purged with nitrogen gas, and thereafter hydrogenation reaction was conducted for 5 hours at a temperature of 80° C. in hydrogen atmosphere using a Ni/Al Ziegler hydrogenated catalyst to obtain a poly(α-methyl styrene)-hydrogenated poly(isoprene/1,3-butadiene)-poly(α-methyl styrene) type copolymer (hereinafter abbreviated as HmS(I/B)mS). The degree of hydrogenation of the obtained HmS(I/B)mS was determined by means of $^1$H-NMR spectrum measurement and the result is shown in Table 1.

Reference Example 10

Preparation of Block Copolymer 2000 g of fully dewatered cyclohexane, 150 g of fully dewatered styrene, and 17.1 g of sec-butyl lithium (1.3M, cyclohexane solution) were charged in a pressure vessel having a stirrer and polymerized for 60 minutes at 50° C. Thereafter 350 g of isoprene was added and polymerization was conducted for 60 minutes. At this stage, part of polymerization solution was drawn out and the polymerization was halted by means of methanol to obtain polystyrene-polyisoprene type diblock copolymer (hereinafter abbreviated as SI).

Further, 17.8 ml of α,α'-dichloro-p-xylene (0.5M, toluene solution) was added to the polymerization solution in the pressure vessel and a coupling reaction was conducted to synthesize polystyrene-polyisoprene-polystyrene type triblock copolymer (hereinafter abbreviated as SIS). The molecular properties of the obtained SI and SIS were determined by means of GPC and $^1$H-NMR spectrum measurement and the results are shown in Table 1.

Reference Example 11

Preparation of Hydrogenated Block Copolymer

The cyclohexane solution of SI synthesized in the reference example 10 was prepared and charged in a pressure vessel which was fully purged with nitrogen gas, and thereafter hydrogenation reaction was conducted for 5 hours at a temperature of 80° C. in hydrogen atmosphere using a Ni/Al Ziegler hydrogenated catalyst to obtain a polystyrene-hydrogenated polyisoprene type diblock copolymer (hereinafter abbreviated as SEP). The degree of hydrogenation of the obtained SEP was measured by $^1$H-NMR spectrum analysis and is shown in Table 1.

Reference Example 12

Preparation of Hydrogenated Block Copolymer

The cyclohexane solution of SIS synthesized in the reference example 10 was prepared and charged in a pressure vessel which was fully purged with nitrogen gas, and thereafter a hydrogenation reaction was conducted for 5 hours at a temperature of 80° C. in hydrogen atmosphere using a Ni/Al Ziegler hydrogenated catalyst to obtain a polystyrene-hydrogenated polyisoprene-polystyrene type triblock copolymer (hereinafter abbreviated as SEPS). The degree of hydrogenation of the obtained SEPS was measured by $^1$H-NMR spectrum analysis and is shown in Table 1.

Reference Example 13

Preparation of Block Copolymer 2000 g of fully dewatered cyclohexane, 150 g of fully dewatered styrene and 17.1 g of sec-butyl lithium (1.3M, cyclohexane solution) were charged in a pressure vessel having a stirrer and polymerized for 60 minutes at 50° C. Thereafter 4.9 g of tetrahydrofuran and 350 g of 1,3-butadiene were added and polymerization was conducted for 60 minutes. At this stage, part of polymerization solution was drawn out and the polymerization was halted by means of methanol to obtain polystyrene-poly(1,3-butadiene) type diblock copolymer (hereinafter abbreviated as SB).

Further, 17.8 ml of α,α'-dichloro-p-xylene (0.5M, toluene solution) was added to the polymerization solution in the pressure vessel and stirred for one hour at 60° C. to synthesize polystyrene-poly(1,3-butadiene)-polystyrene type triblock copolymer (hereinafter abbreviated as SBS) through a coupling reaction. The molecular properties of the obtained SB and SBS were determined by GPC and $^1$H-NMR spectrum measurement and the results are shown in Table 1.

Reference Example 14

Preparation of Hydrogenated Block Copolymer

The cyclohexane solution of SB synthesized in the reference example 13 was prepared and charged in a pressure vessel which was fully purged with nitrogen gas, and thereafter a hydrogenation reaction was conducted for 5 hours at a temperature of 80° C. in hydrogen atmosphere using a Ni/Al Ziegler hydrogenated catalyst to obtain a polystyrene-hydrogenated poly(1,3-butadiene) type diblock copolymer (hereinafter abbreviated as SEB). The degree of hydrogenation of the obtained SEB was measured by $^1$H-NMR spectrum analysis and is shown in Table 1.

Reference Example 15

Preparation of Hydrogenated Block Copolymer

The cyclohexane solution of SBS synthesized in the reference example 13 was prepared and charged in a pressure vessel which was fully purged with nitrogen gas, and thereafter a hydrogenation reaction was conducted for 5 hours at a temperature of 80° C. in hydrogen atmosphere using a Ni/Al Ziegler hydrogenated catalyst obtain a polystyrene-hydrogenated poly(1,3-butadiene)-polystyrene type triblock copolymer (hereinafter abbreviated as SEBS). The degree of hydrogenation of the obtained SEBS was measured by $^1$H-NMR spectrum analysis and is shown in Table 1.

TABLE 1

| No. | Abbreviation | Type | Composition (wt %) Polymer block (A) | Molecular weight[1] (Mn) Polymer block (A) | Total | Degree of hydrogenation (%) |
|---|---|---|---|---|---|---|
| 1 | HmSBmS-1 | A-B-A | 33 | 10,000 | 111,000 | 99.2 |
| 2 | mSBmS | A-B | 31 | 7,100 | 79,500 | 0 |
| 3 | HmSB | A-B | 31 | 7,100 | 38,700 | 99.8 |
| 4 | HmSBmS-2 | A-B-A | 31 | 7,100 | 79,500 | 97.5 |
| 5 | HmSBmS-3 | A-B-A | 29 | 9,400 | 103,000 | 99.0 |
| 6 | mSImS | A-B-A | 28 | 6,400 | 79,500 | 0 |
| 7 | HmSI | A-B | 28 | 6,400 | 39,800 | 99.9 |
| 8 | HmSImS | A-B-A | 28 | 6,400 | 90,000 | 99.6 |
| 9 | HmS(I/B)mS | A-B-A | 33 | 9,000 | 109,000 | 97.1 |
| 10 | SIS | A-B-A | 30 | 8,000 | 72,100 | 0 |
| 11 | SEP | A-B | 30 | 8,000 | 36,000 | 98.5 |
| 12 | SEPS | A-B-A | 30 | 8,000 | 72,100 | 97.3 |
| 13 | SBS | A-B-A | 30 | 8,000 | 90,000 | 0 |
| 14 | SEB | A-B | 30 | 8,000 | 45,000 | 99.2 |
| 15 | SEBS | A-B-A | 30 | 8,000 | 90,000 | 98.7 |
| 16 | SEEPS | A-B-A | 35 | 16,000 | 160,000 | 99.1 |

[1]Molecular weight (polystyrene conversion).

Reference Example 16

Preparation of Hydrogenated Block Copolymer 2000 g of fully dewatered cyclohexane, 87.5 g of fully dewatered styrene, and 3.6 ml of sec-butyl lithium (1.3M, cyclohexane solution) were charged in a pressure vessel having a stirrer and polymerized for 60 minutes at 50° C. Thereafter 325 g of a mixed monomer, which was blended in a composition of isoprene/1,3-butadiene=60/40 (by weight ratio) in advance, was added and polymerization was conducted for 60 minutes. Then 87.5 g of styrene was further added and polymerization was conducted for 60 minutes. Thereafter the polymerization was halted by adding methanol to obtain polystyrene-poly(isoprene/1,3-butadiene)-polystyrene type triblock copolymer. A cyclohexane solution of the obtained polystyrene-poly(isoprene/1,3-butadiene)-polystyrene type triblock copolymer was prepared and charged in a pressure vessel fully purged with nitrogen gas, and thereafter hydrogenation reaction was conducted for 5 hours at 80° C. in hydrogen atmosphere utilizing a Ni/Al Ziegler hydrogenated catalyst to obtain polystyrene- hydrogenated poly(isoprene/1,3-butadiene)-polystyrene type triblock copolymer (hereinafter abbreviated as SEEPS). The degree of hydrogenation of the obtained SEEPS was determined by $^1$H-NMR spectrum measurement and is shown in Table 1.

Examples 1 to 17 and Reference Examples 1 to 8

The block copolymers obtained as the reference examples, a tackifying resin and a plasticizer were charged into a kneader, which were heated to 160° C., according to the composition shown in tables 2 to 5 (all are shown by part by weight) and mixed in molten state for 30 minutes to obtain a composition. The composition was then coated on a film of polyethylene terephthalate by use of a 40 μm coater to obtain a adhesive tape. Performance tests were conducted by using the obtained adhesive tapes. The results indicate that the examples 1 to 17, which are within the scope of the present invention, show relatively high holding power compared to the reference examples.

TABLE 2

| Run. | | Example 1 | Example 2 | Example 3 | Example 4 | Reference example 1 | Reference example 2 |
|---|---|---|---|---|---|---|---|
| Composition | | | | | | | |
| HmSBmS-1 | | 100 | | | | | |
| HmSBmS-3 | | | 100 | | | | |
| HmS(I/B)mS | | | | 100 | 100 | | |
| SEEPS | | | | | | 100 | 100 |
| Diana Process PW-90 | | 100 | 100 | 100 | 133 | 100 | 133 |
| ALCON P-100 | | 300 | 300 | 300 | 400 | 300 | 400 |
| Irganox1010 | | 1 | 1 | 1 | 1 | 1 | 1 |
| Cohesion 80° C. | Holding power (min.) | >240 | >240 | >240 | 47 | 45 | 11 |
| | Slippage (mm) | 0 | 1.70 | 1.25 | — | — | — |
| Adhesion (vs. PE) | (g) | 615 | 200 | 900 | 350 | 675 | 300 |
| (vs. stainless) | (g) | 825 | 230 | 950 | 600 | 600 | 550 |

Diana Process PW-90: Plasticizer (Product of IDEMITSU KOSAN CO., LTD.; Hydrogenated paraffin oil)
ALCON P-100: Tackifying resin (Product of ARAKAWA CHEMICAL INDUSTRIES, LTD.; Alicyclic saturated hydrocarbon resin)
Irganox1010: Antioxidant (Ciba/SPECIALTY CHEMICALS CO., LTD.; Hindered phenol antioxidant)

Diana Process PW-90: Plasticizer (Product of IDEMITSU KOSAN CO., LTD.; Hydrogenated paraffin oil) ALCON P-100: Tackifying resin (Product of ARAKAWA CHEMICAL INDUSTRIES, LTD.; Alicyclic saturated hydrocarbon resin) Irganox1010: Antioxidant (Ciba/SPECIALTY CHEMICALS CO., LTD.; Hindered phenol antioxidant)

TABLE 3

| Run. | | Example 5 | Example 6 | Example 7 | Reference Example 3 | Reference Example 4 |
|---|---|---|---|---|---|---|
| Composition | | | | | | |
| HmSBmS-2 | | 100 | 100 | | | |
| HmSImS | | | | 100 | | |
| SEBS | | | | | 100 | |
| SEPS | | | | | | 100 |
| PW-90 | | 100 | 100 | 100 | 100 | 100 |
| ALCON P-100 | | 300 | | | 300 | 300 |
| YS RESIN PX-1000 | | | 300 | | | |
| ESCOLETS 1310 | | | | 300 | | |
| Irganox1010 | | 1 | 1 | 1 | 1 | 1 |
| Cohesion 80° C. | Holding power (min.) | 52 | 107 | 75 | 31 | 28 |
| | Slippage (mm) | — | — | — | — | — |
| Adhesion (vs. PE) | (g) | 1,000 | 600 | 900 | 1,000 | 1,150 |
| (vs. Stainless) | (g) | 1,275 | 375 | 850 | 1,300 | 1,350 |

YS RESIN PX-1000: Tackifying resin (Product of YASUHARA CHEMICALS CO., LTD.; Terpene resin)
ESCOLETS 1310: Tackifying resin (Product of TONEX CO., LTD.; Aliphatic hydrocarbon resin)

YS RESIN PX-1000: Tackifying resin (Product of YASUHARA CHEMICALS CO., LTD., Terpene resin) ESCOLETS 1310: Tackifying resin (Product of TONEX CO., LTD.; Aliphatic hydrocarbon resin)

TABLE 4a

| Run. | | Example 8 | Example 9 | Example 10 | Example 11 | Example 12 |
|---|---|---|---|---|---|---|
| Composition | | | | | | |
| HmSBmS | | 70 | 27 | 27 | 27 | |
| HmSImS | | | | | | |
| HmSB | | 30 | 73 | 73 | 73 | 73 |
| HmSI | | | | | | |
| SEBS | | | | | | 27 |
| SEPS | | | | | | |
| SEB | | | | | | |
| SEP | | | | | | |
| PW-90 | | 100 | 100 | 100 | 100 | 100 |
| ALCON P-100 | | 300 | 300 | | | 300 |
| YS RESIN PX-1000 | | | | 300 | | |
| ESCOLETS 1310 | | | | | 300 | |
| Irganox1010 | | 1 | 1 | 1 | 1 | 1 |
| Cohesion 60° C. | Holding power (min.) | 83 | 24 | 38 | 57 | 22 |
| | Slippage (mm) | — | — | — | — | — |
| Adhesion (vs. PE) | (g) | 1,050 | 1,050 | 1,000 | 250 | 900 |
| (vs. Stainless) | (g) | 1,450 | 1,250 | 1,000 | 440 | 1,225 |

TABLE 4B

| Run. | Example 13 | Reference example 5 | Example 14 | Example 15 | Reference example 6 |
|---|---|---|---|---|---|
| Composition | | | | | |
| HmSBmS | | | | 50 | |
| HmSImS | | | | | 50 |
| HmSB | | | | | |

TABLE 4B-continued

| Run. | | Example 13 | Reference example 5 | Example 14 | Example 15 | Reference example 6 |
|---|---|---|---|---|---|---|
| HmSI | | 73 | | | | |
| SEBS | | | 27 | | | |
| SEPS | | 27 | | | | 50 |
| SEB | | | 73 | 50 | | |
| SEP | | | | | 50 | 50 |
| PW-90 | | 100 | 100 | 100 | 100 | 100 |
| ALCON P-100 | | | 300 | 300 | 300 | 300 |
| YS RESIN PX-1000 | | 300 | | | | |
| ESCOLETS 1310 | | | | | | |
| Irganox1010 | | 1 | 1 | 1 | 1 | 1 |
| Cohesion 60° C. | Holding power (min.) | 32 | 9 | 45 | 41 | 23 |
| | Slippage (mm) | — | — | — | — | — |
| Adhesion (vs. PE) | (g) | 1,150 | 950 | 950 | 1,020 | 1,150 |
| (vs. Stainless) | (g) | 1,350 | 1,100 | 1,075 | 1,220 | 1,350 |

TABLE 5

| Run. | | Example 16 | Example 17 | Reference example 7 | Reference example 8 |
|---|---|---|---|---|---|
| Composition | | | | | |
| mSBmS | | 100 | | | |
| mSImS | | | 100 | | |
| SBS | | | | 100 | |
| SIS | | | | | 100 |
| PW-90 | | 100 | 100 | 100 | 100 |
| ALCON P-100 | | 300 | 300 | 300 | 300 |
| Irganox1010 | | 1 | 1 | 1 | 1 |
| Cohesion 60° C. | Holding power (min.) | 52 | 49 | 22 | 19 |
| | Slippage (mm) | — | — | — | — |
| Adhesion (vs. PE) | (g) | 890 | 850 | 880 | 860 |
| (vs. Stainless) | (g) | 970 | 1,030 | 950 | 1,080 |

Industrial Applicability

According to the present invention, adhesive compositions which excel in high temperature holding power (cohesion) may be provided. The present invention also provides block copolymers which can be preferably used for the adhesive compositions.

What is claimed is:

1. An adhesive composition containing a block copolymer, characterized in that the block copolymer has a polymer block (A) which is principally composed of an α-methyl styrene unit, and a polymer block (B) which is principally composed of a conjugated diene unit and of which at least part of the carbon-carbon unsaturated double bonds may be hydrogenated, wherein said block copolymer includes:
   (1) a polymer block (A) which has a number-average molecular weight of 1,000 to 300,000; and
   (2) a polymer block (B) including: a polymer block (b1) which has a number-average molecular weight of 500 to 10,000 and of which 1,4-bond content is less than 30%; and a polymer block (b2) which has a number-average molecular weight of 10,000 to 400,000 and of which 1,4-bond content is not less than 30%, and in that the block copolymer has at least one (A-b1-b2) structure.

2. An adhesive composition containing a block copolymer, characterized in that the block copolymer includes at least one (A-b1-b2) structure obtained by:
   (1) forming a polymer block (A) by polymerizing α-methyl styrene of a 5 to 50% by weight concentration at a temperature from −30° C. to 30° C. in the presence of a polar compound of 0.1 to 10% by weight concentration using a organic lithium compound as an initiator in a nonpolar solvent; then
   (2) forming a polymer block (b1) by polymerizing 1 to 100 mol equivalent of conjugated diene with respect to living poly-α-methyl styryl lithium; and thereafter
   (3) forming a polymer block (b2) by polymerizing remaining conjugated dienes at a temperature higher than 30° C.

3. The adhesive composition according to claim 1, wherein the conjugated diene unit in the polymer block (B) is principally a 1,3-butadiene unit and/or an isoprene unit.

4. The adhesive composition according to claim 1, wherein the conjugated diene unit in the polymer block (B) is principally a 1,3-butadiene unit.

5. A block copolymer, having a polymer block (A) which is principally composed of a α-methyl styrene unit, and a polymer block (B) which is principally composed of a conjugated diene unit and of which at least part of the carbon-carbon unsaturated double bonds may be hydrogenated, wherein said block copolymer includes:
   (1) a polymer block (A) having a number-average molecular weight of 1,000 to 300,000; and
   (2) a polymer block (B) containing a polymer block (b1) having a number-average molecular weight of 500 to 10,000 and a 1,4-bond content of less than 30%, and a polymer block (b2) having a number-average molecular weight of 10,000 to 400,000 and a 1,4-bond content of not less than 30%, and said block copolymer includes at least one (A-b1-b2) structure.

6. The block copolymer according to claim 5, wherein the conjugated diene units forming the block b1 and the block b2 are 1,3-butadiene unit and/or isoprene unit.

7. The block copolymer according to claim 6, wherein each of the conjugated diene units forming the block b1 and the block b2 is 1,3-butadiene unit.

8. The block copolymer according to any one of claim 5, wherein at least part of the carbon-carbon unsaturated double bonds resulting from the conjugated diene unit of the polymer block (B) are hydrogenated.

9. The adhesive composition according to claim 2, wherein the conjugated diene unit in the polymer block (B) is principally a 1,3-butadiene unit and/or an isoprene unit.

10. The adhesive composition according to claim 2, wherein the conjugated diene unit in the polymer block (B) is principally a 1,3-butadiene unit.

* * * * *

UNITED STATES PATENT AND TRADEMARK OFFICE
CERTIFICATE OF CORRECTION

PATENT NO. : 6,806,317 B1
DATED : October 19, 2004
INVENTOR(S) : Morishita et al.

It is certified that error appears in the above-identified patent and that said Letters Patent is hereby corrected as shown below:

Column 22,
Line 57, delete "any one of".

Signed and Sealed this

Eighteenth Day of January, 2005

JON W. DUDAS
*Director of the United States Patent and Trademark Office*